United States Patent
Yang

(10) Patent No.: US 6,555,990 B1
(45) Date of Patent: Apr. 29, 2003

(54) MOBILE TELEPHONE BATTERY CHARGER WITH POWER INDICATOR MEANS

(76) Inventor: Fu-I Yang, 5th Floor, 101, Hsin Pu 8th Street, TaoYuan City (TW)

( * ) Notice: Subject to any disclaimer, the term of this patent is extended or adjusted under 35 U.S.C. 154(b) by 0 days.

(21) Appl. No.: 10/108,488

(22) Filed: Mar. 29, 2002

(51) Int. Cl.$^7$ .............................................. H01M 10/46
(52) U.S. Cl. ...................................... 320/113; 320/115
(58) Field of Search ................................ 320/107, 110, 320/111, 112, 113, 114, 115

(56) References Cited

U.S. PATENT DOCUMENTS

| | | | |
|---|---|---|---|
| 5,583,413 A | * | 12/1996 | Proctor et al. |
| 5,818,197 A | * | 10/1998 | Miller et al. |
| 5,939,855 A | * | 8/1999 | Proctor et al. |

* cited by examiner

Primary Examiner—Edward H. Tso
(74) Attorney, Agent, or Firm—Rosenberg, Klein & Lee

(57) ABSTRACT

A mobile telephone battery charger is constructed to include a LCD, a selector switch, and a microprocessor controlled by the selector switch to drive the LCD to indicate the voltage value or current value of output charging electricity.

1 Claim, 5 Drawing Sheets

MOBILE TELEPHONE BATTERY CHARGER WITH POWER INDICATOR MEANS

BACKGROUND OF THE INVENTION

1. Field of the Invention

The present invention relates to a mobile telephone battery charger and, more specifically, to such a mobile telephone battery charger, which has means to detect and indicate the value of electric voltage or current of electric power passing through.

2. Description of the Related Art

FIG. 1 illustrates a conventional mobile telephone battery charger 1, which comprises an AC/DC adapter 11, and a cable 13 extended from one end of the AC/DC adapter 11 for connecting the AC/DC adapter 11 to a mobile telephone M. The AC/DC adapter 11 comprises a set of metal blades 12 for insertion into an electric outlet (not shown) to receive AC power supply, and a LED (light emitting diode) 14, which emits light when electric current passing through the AC/DC adapter 11. The AC/DC adapter 11 converts AC power supply into DC power supply for charging the battery of the mobile telephone M connected to the cable 13. This design of mobile telephone battery charger is still not satisfactory in function. After a long use of the mobile telephone battery charger, the internal electronic component parts of the AC/DC adapter 11 may be damaged or not functioning well. In this case, the output voltage of the AC/DC adapter 11 differs from the rated value, for example, changed from 3.8V to 4.2V or 4.5V. Charging the battery of a mobile telephone M with a higher voltage than the rated value may affect the functioning of the battery or the internal charging circuit of the mobile telephone and shorten their service life. Further, when charging the battery of a mobile telephone M, the power level indication block shown on the display screen of the mobile telephone M is simply a rough indication that does not accurately tells the value of the power level of the battery. Excessively charging the battery may shorten its service life, or cause damage to it.

SUMMARY OF THE INVENTION

The present invention has been accomplished to provide a mobile telephone battery charger, which eliminates the aforesaid problems. It is one object of the present invention to provide a mobile telephone battery charger, which indicates the voltage value of the charging power before charging the battery, preventing an abnormal charging of charging the battery with wrong voltage. It is another object of the present invention to provide a mobile telephone battery charger, which indicates the current value of the charging power when charging the battery, enabling the user to know the power storage status of the battery. To achieve these and other objects of the present invention, the mobile battery charger comprises a LCD, a selector switch, and a microprocessor controlled by the selector switch to drive the LCD to indicate the voltage value or current value of output charging electricity. Before charging the battery, the selector switch is switched to the voltage indication position to drive the microprocessor to indicate the voltage value of the output charging electricity through the LCD, preventing an error charging action to damage the battery of the mobile telephone. During charging, the selector switch is switched to the current indication position to drive the microprocessor to indicate the current value of the output charging electricity through the LCD. By means of the variation speed of the indication of current value to zero reading, the user knows the power storage ability of the battery of the mobile telephone been charged.

DETAILED DESCRIPTION OF THE PREFERRED EMBODIMENT

Figure 1:
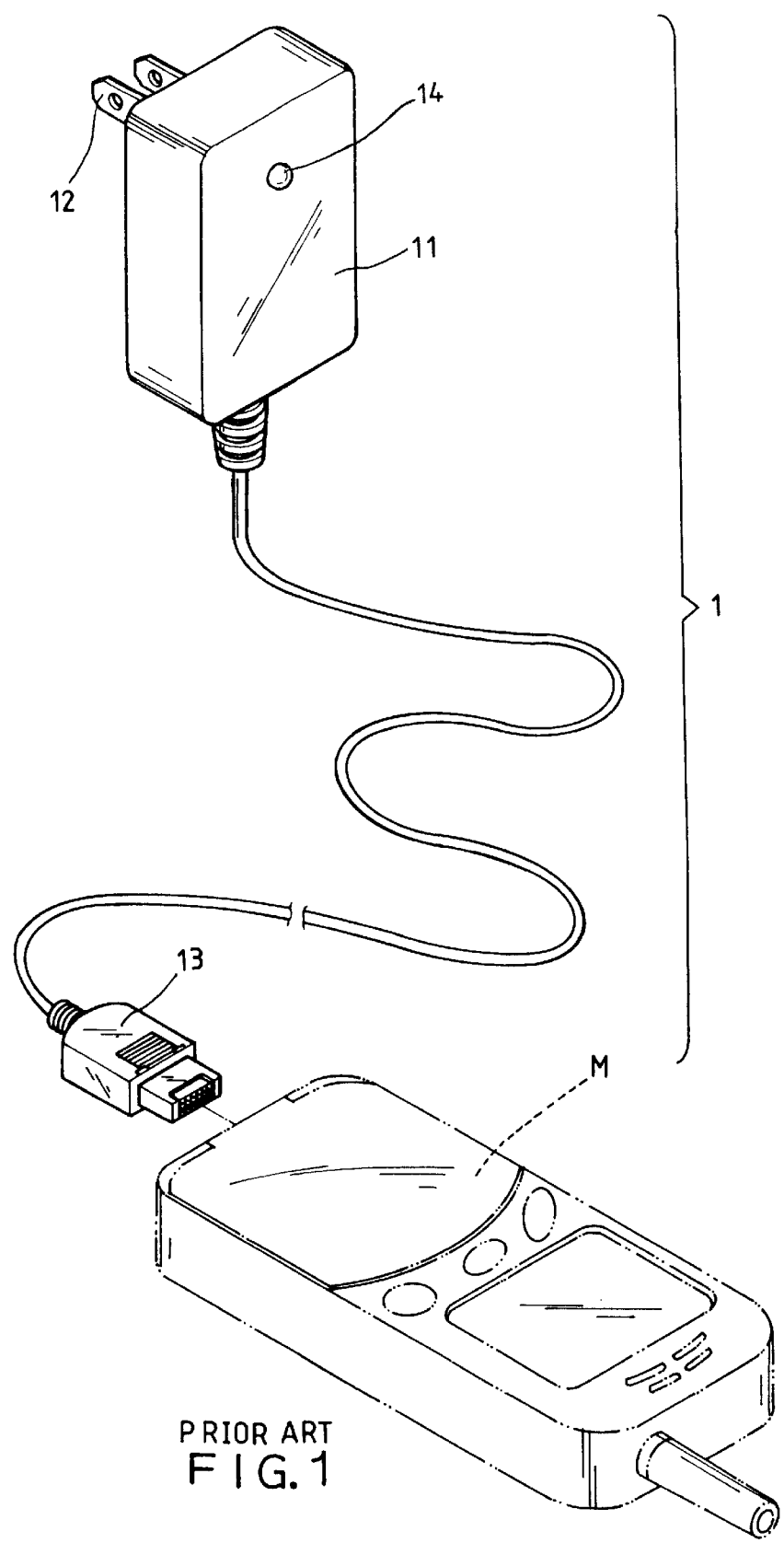
FIG. 1 illustrates the use of a mobile telephone battery charger with a mobile telephone according to the prior art.
Figure 2:
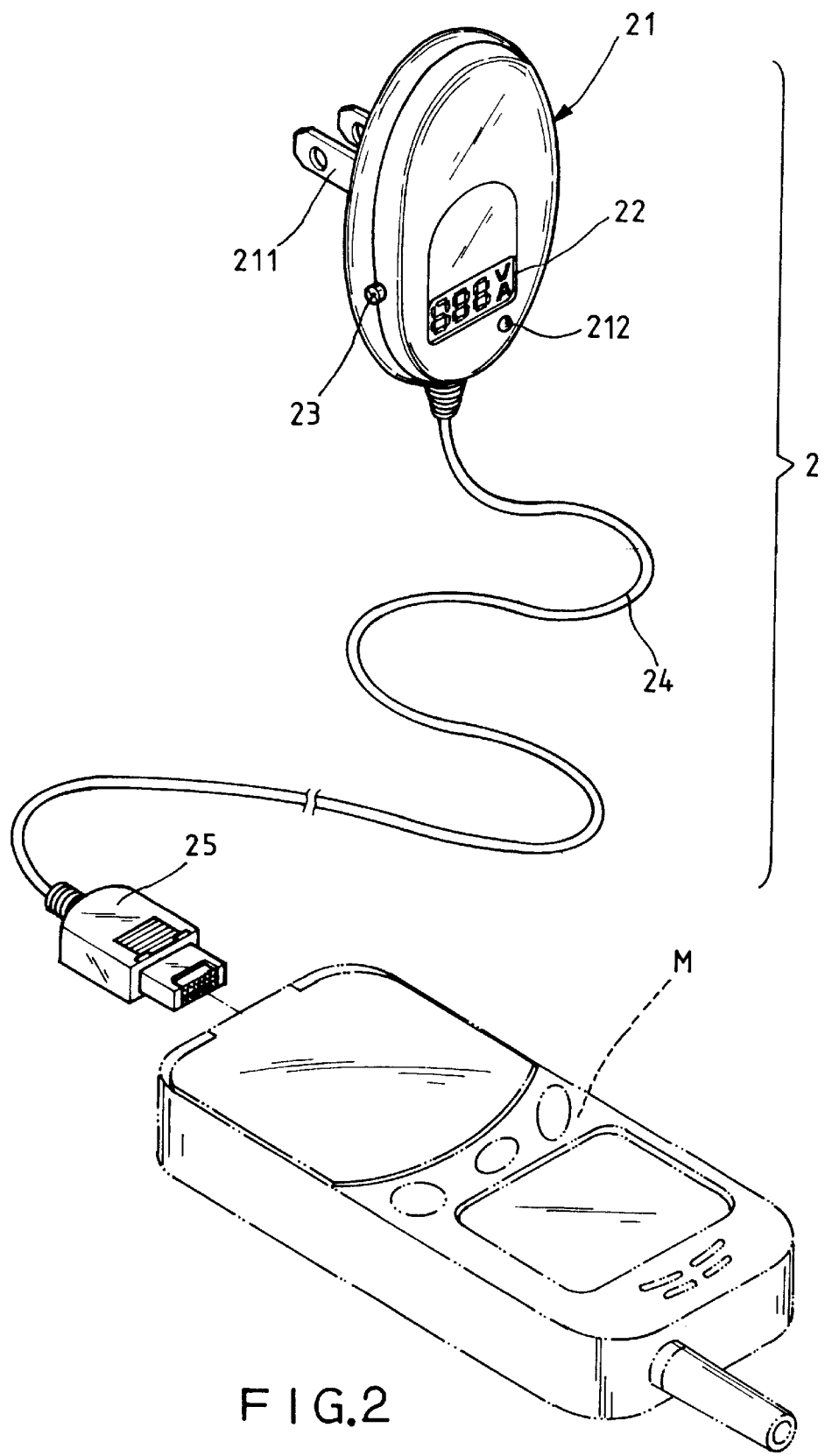
FIG. 2 illustrates the use of a mobile telephone battery charger with a mobile telephone according to the present invention.

Referring to FIG. 2, a mobile telephone battery charger 2 is shown comprised of an AC/DC adapter 21 provided with metal blades 211 for connection to an electric outlet to receive AC power, an electric connector 25 for connection to a mobile telephone M, and a cable 24 connected between the AC/DC adapter 21 and the electric connector 25 for transmitting DC power to the mobile telephone M being connected to the electric connector 25. The AC/DC adapter 21 further comprises a LCD 22 for indicating the voltage value V or current value A of power passed out of the AC/DC adapter 21 to the cable 24, and a voltage/current selector switch 23 adapted to control the AC/DC adapter 21 between the voltage value display mode and the current value display mode.

Figure 3:
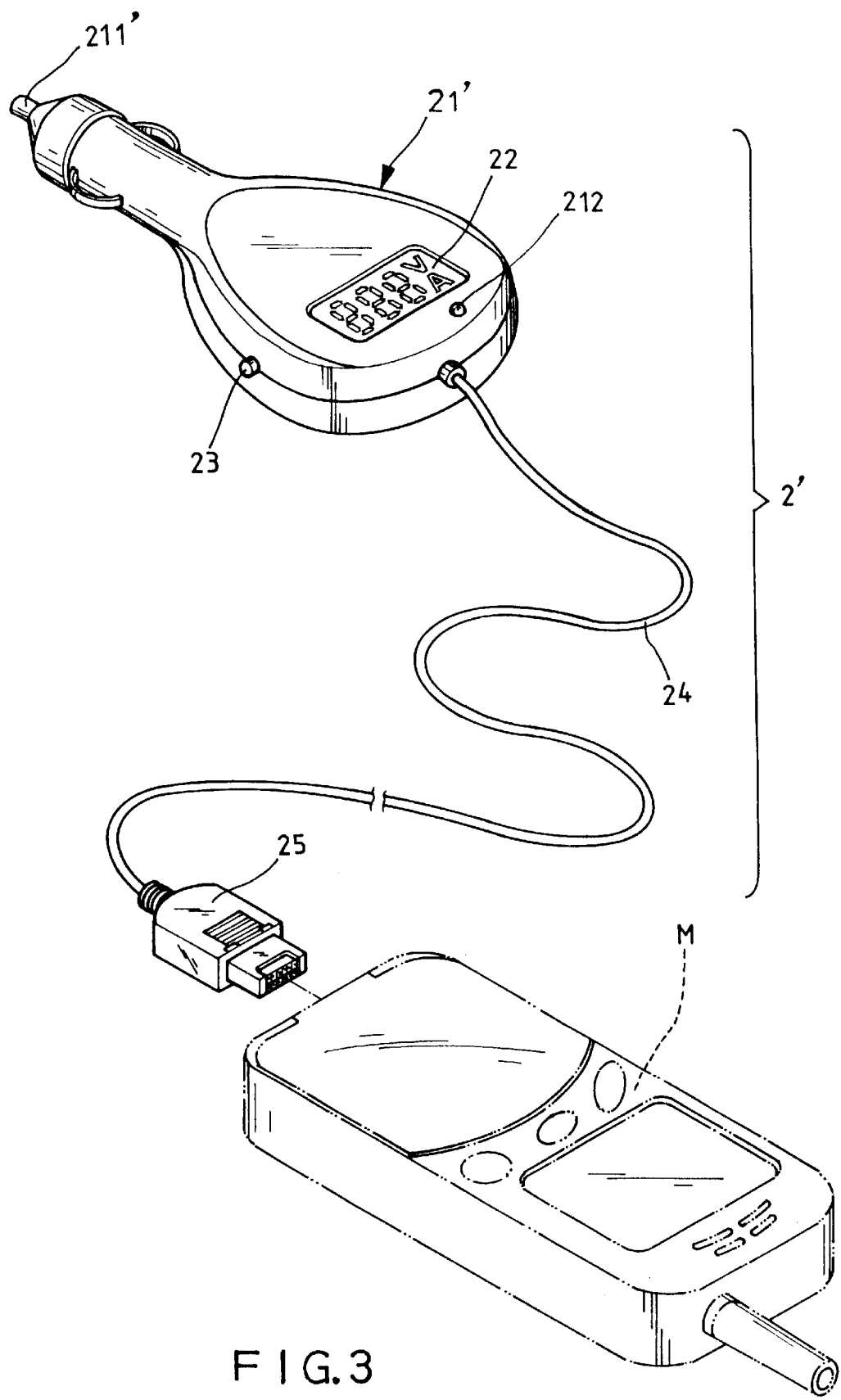
FIG. 3 illustrates an alternate form of the present invention.

FIG. 3 shows an alternate form of the present invention. According to this alternate form, the mobile telephone battery charger 2' comprises a power adapter 21' provided with an electric plug 211' for connection to the electric socket for cigarette lighter of a car to receive car battery power supply, an electric connector 25 for connection to a mobile telephone M, and a cable 24 connected between the power adapter 21' and the electric connector 25 for transmitting DC power to the mobile telephone M being connected to the electric connector 25. The power adapter 21' further comprises a LCD 22 for indicating the voltage value V or current value A of power passed out of the power adapter 21' to the cable 24, and a voltage/current selector switch 23 adapted to control the power adapter 21 between the voltage value display mode and the current value display mode.

Figure 4:
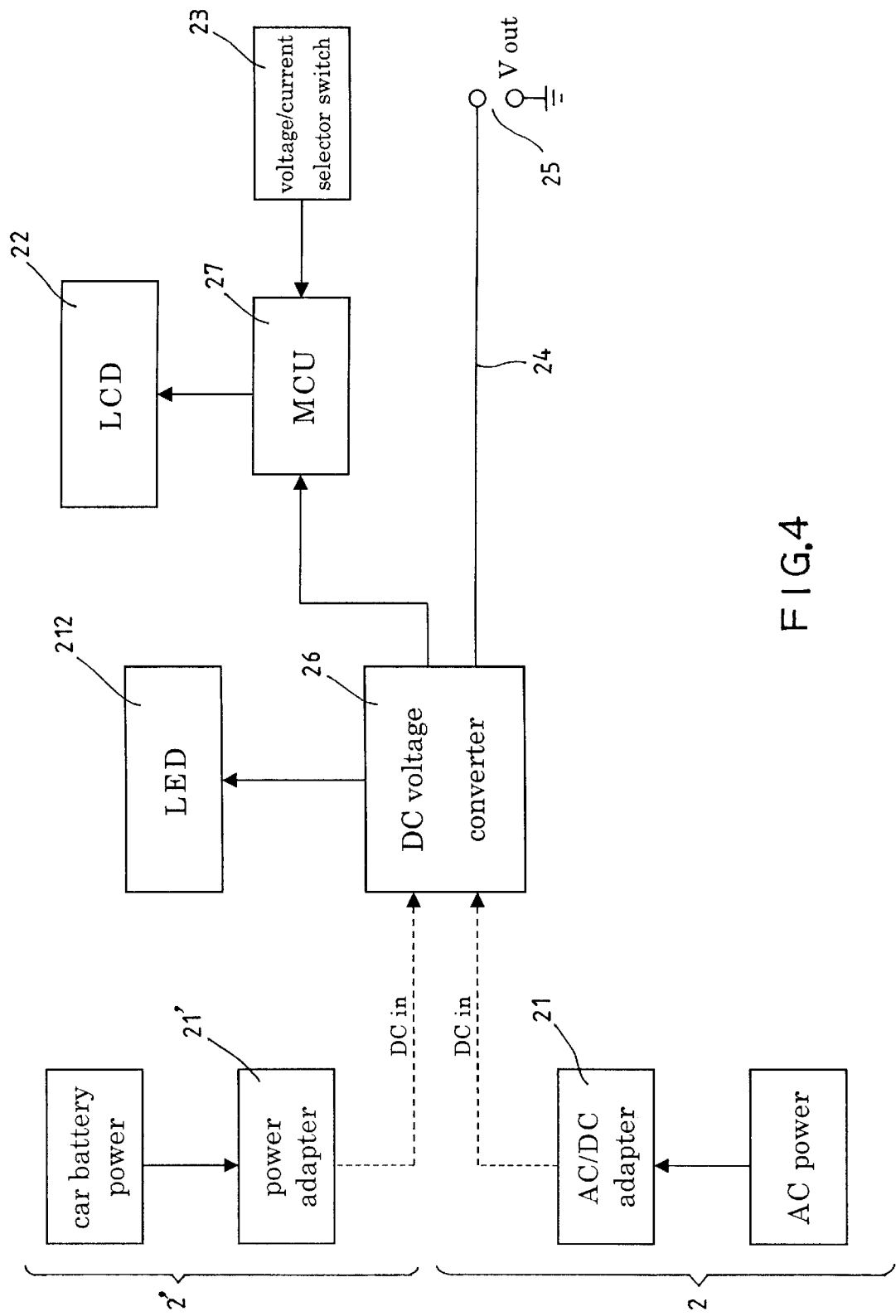
FIG. 4 is a circuit block diagram of the mobile telephone battery charger according to the present invention.
Figure 5:
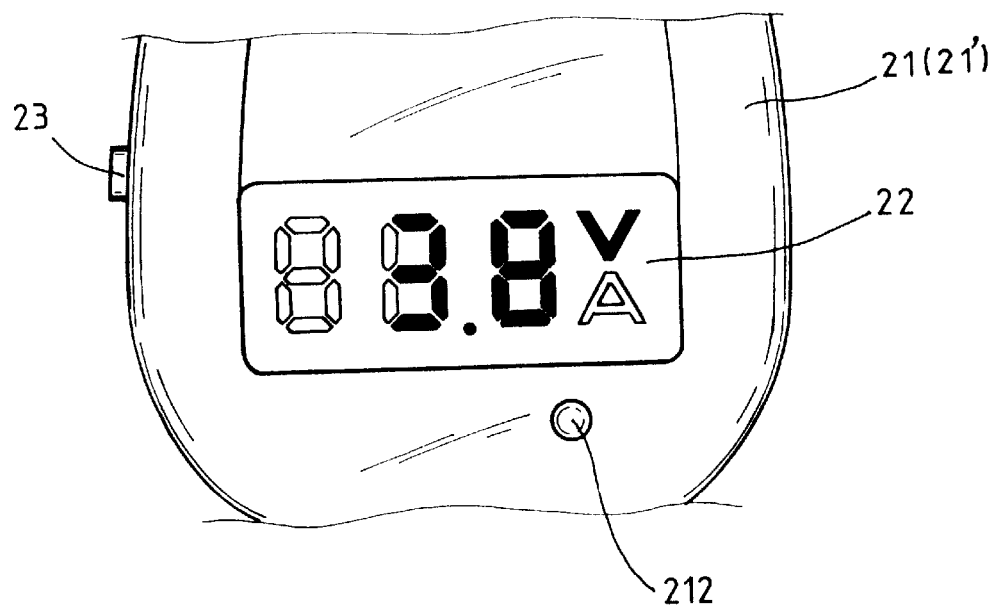
FIG. 5 shows a voltage value indication status of the mobile telephone battery charger according to the present invention.
Figure 6:
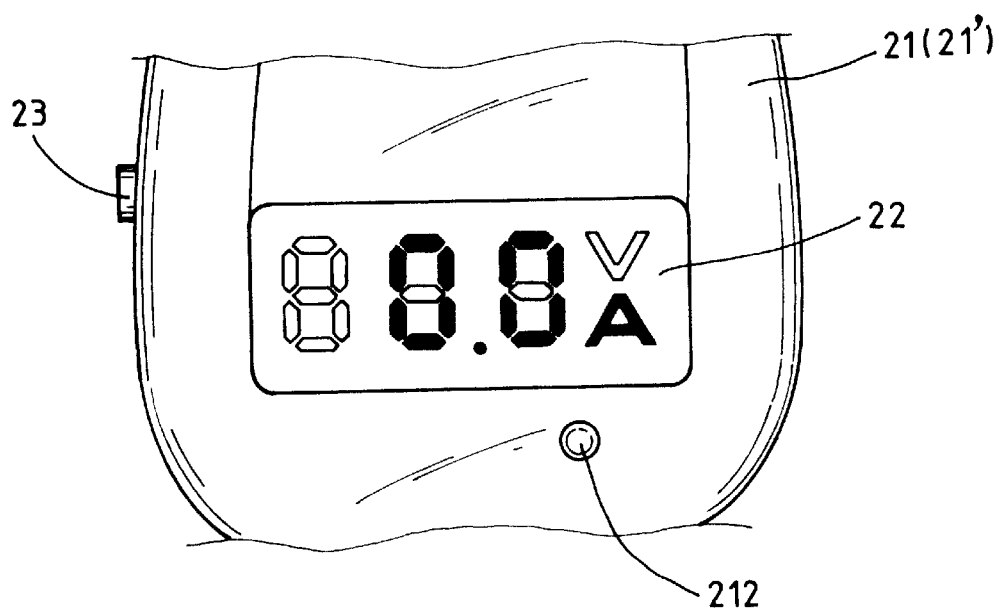
FIG. 6 shows a current value indication status of the mobile telephone battery charger according to the present invention.

Referring to FIG. 4, after connection of the AC/DC adapter 21 to AC power source, the AC power is converted into DC power (for example, AC110V or 220V into DC5V and then transmitted to a DC voltage converter 26, which converts DC power into the set DC voltage value (for example, DC5V into 4.5V, 4.2V, or 3.8V) for charging the battery of the mobile telephone through the cable 24 and the electric connector 25. In case the power adapter 21' is used and connected to the electric socket for cigarette lighter of a car, the DC voltage converter 26 converts inputted DC12V into the desired voltage value for charging the battery of the mobile telephone connected to the electric connector 25. Upon input of DC power into the DC voltage converter 26, the LED 212, which is connected to the DC voltage converter 26, is turned on. The mobile telephone battery charger 2' further comprises a microprocessor (main control unit) 27 electrically connected between the DC voltage converter 26 and the LCD 22, and controlled by the voltage/current selector switch 23 to display the voltage value (see FIG. 5) or current value (see FIG. 6) of charging electricity at the output end of the DC voltage converter 26 to the cable 24. Before charging, the voltage/current selector switch 23 is switched to the voltage indication position to drive the microprocessor 27 to indicate the voltage value V of the output power of the DC voltage converter 26 through the LCD 22. If the displayed voltage value V is equal to the charging voltage (for example, 3.8V) of the mobile telephone M to be charged, the electric connector 25 is connected to the mobile telephone M to start charging the battery of the mobile telephone M. When charging operation started, the voltage/current selector switch 23 is switched to the current indication position to drive the microprocessor 27 to indicate the current value A of the output power of the DC voltage converter 26 through the LCD 22. If the displayed current value V is zeroed, it means that the battery of the mobile telephone M has been charged to the saturated status, and the charging action should be terminated. Further, the user can know the power storage ability of the battery of the mobile telephone M subject to the variation of the displayed current value V. If the displayed current value V is zeroed quickly within a very short time during charging operation, it means that the battery of the mobile telephone M has high internal impedance, and should be replaced.

A prototype of mobile telephone battery charger has been constructed with the features of the annexed drawings of FIGS. 2~6. The mobile telephone battery charger functions smoothly to provide all of the features discussed earlier.

Although particular embodiments of the invention has been described in detail for purposes of illustration, various modifications and enhancements may be made without departing from the spirit and scope of the invention. Accordingly, the invention is not to be limited except as by the appended claims.

What the invention claimed is:

1. A mobile telephone battery charger comprising:

a power adapter connectable to external power supply means; and a cable extended from said power adapter and terminating in an electric connector for connection to a mobile telephone to transmit electricity from said power adapter to the mobile telephone to charge the battery of the mobile telephone;

wherein said power adapter comprises display means for indicating the voltage value/current value of electricity passing to said cable, selector switch means, and a microprocessor controlled by said selector switch means to drive said display means to indicate the voltage value/current value of electricity passing to said cable.

* * * * *